June 7, 1966  K. H. WERNER  3,254,747
RELEASE BEARING FOR A FRICTION CLUTCH
Filed March 25, 1964  2 Sheets-Sheet 1

INVENTOR
Karl Heinz Werner

June 7, 1966     K. H. WERNER     3,254,747
RELEASE BEARING FOR A FRICTION CLUTCH
Filed March 25, 1964     2 Sheets-Sheet 2

INVENTOR
Karl Heinz Werner
By Richard Ling
Ag't

United States Patent Office 3,254,747
Patented June 7, 1966

3,254,747
RELEASE BEARING FOR A FRICTION CLUTCH
Karl Heinz Werner, Schweinfurt am Main, Germany, assignor to Fichtel & Sachs A.G., Schweinfurt am Main, Germany, a corporation of Germany
Filed Mar. 25, 1964, Ser. No. 354,624
Claims priority, application Germany, July 10, 1963,
F 24,205
13 Claims. (Cl. 192—98)

This invention relates to friction clutches, and more particularly to an improved release mechanism for a friction clutch of a commonly employed automotive type.

The friction clutch with the improvement of which this invention is more specifically concerned has two plate members which are connected for joint rotation about a common axis. One of the plate members normally constitutes a flywheel attached to the crankshaft of an internal combustion engine, and its axial position is fixed. The other plate member, usually referred to as the pressure plate, is urged axially toward the flywheel by clutch springs. A clutch disk or clutch plate is interposed between the flywheel and the pressure plate, and is frictionally engaged by the plate members under the urging of the clutch springs. The input shaft of a multiple-speed transmission is attached to the clutch plate.

It is known to release the clutch by a mechanism which includes several levers. The levers extend radially from the clutch axis and are angularly offset with respect to the axis. Each lever is pivotally mounted on the flywheel, and one of its arms is linked to the pressure plate for axially moving the same when the lever pivots. Each lever has a free end portion near the clutch axis. Axial movement of the free lever end portions in one direction causes the clutch to be released.

The release actuating mechanism of the conventional clutch includes a clutch release fork pivotally mounted on a stationary engine part in such a manner that an abutment element mounted on the clutch release fork moves axially the free ends of the levers when the fork pivots.

The object of this invention is the provision of a simple and reliable arrangement for transmitting the axial movement of the clutch release fork to the several clutch release levers.

A more specific object of the invention is the provision of motion transmitting elements which can be mass-produced to the required tolerances without machining or similar, relatively costly operations, and substantially without mechanical finishing.

Other objects and many of the attendant advantages of this invention will be readily appreciated as the same becomes better understood by reference to the following detailed description when considered in connection with the accompanying drawings in which.

Figure 1:
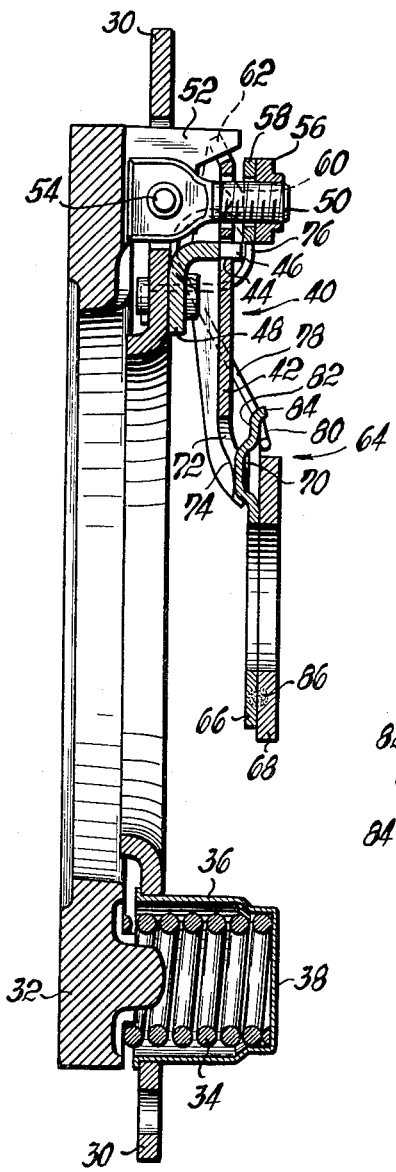
FIG. 1 shows the motion transmitting elements of the invention in the release actuating mechanism of a clutch with which this invention is more specifically concerned, and some other elements of an automotive friction clutch more directly associated with the actuating mechanism, the view being in axial section.
Figure 3:
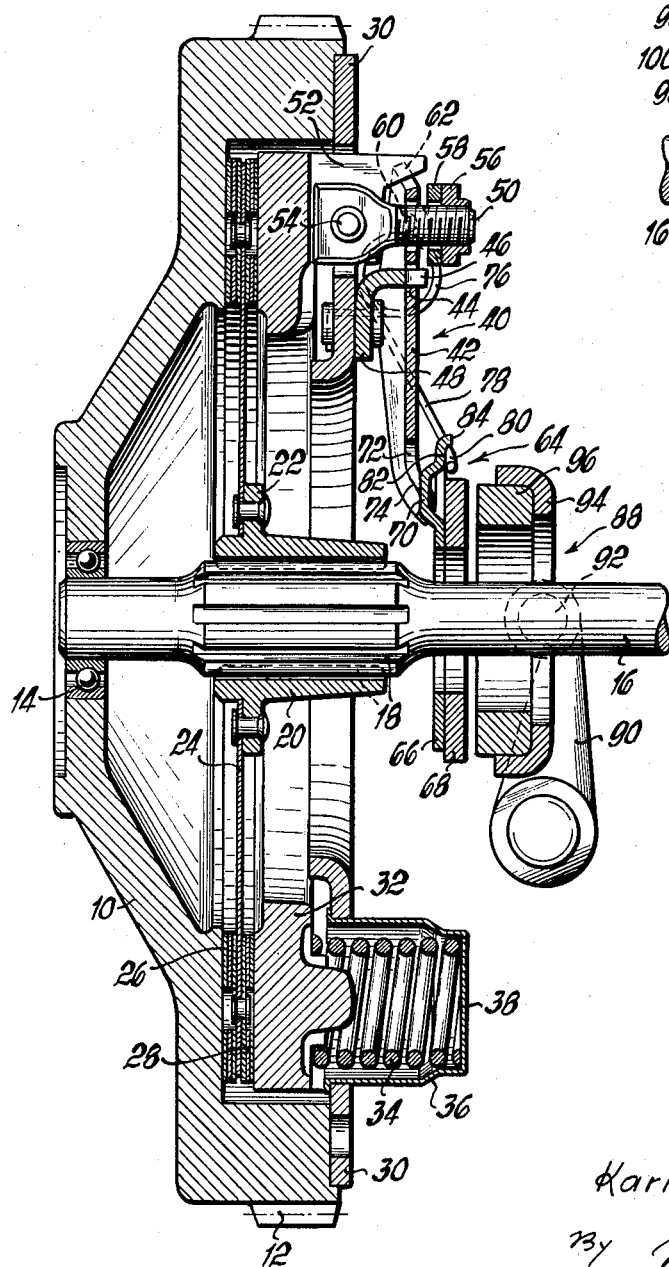
Figure 4:
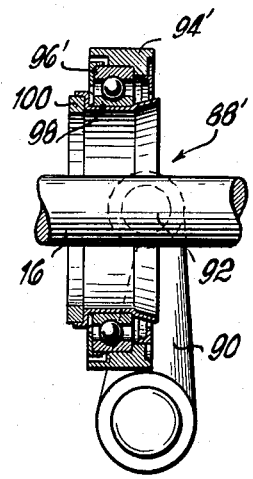

FIG. 3 more completely illustrates the clutch of FIG. 1 in a corresponding view; and FIG. 4 shows a modified detail of the clutch of FIG. 3.

Figure 2:
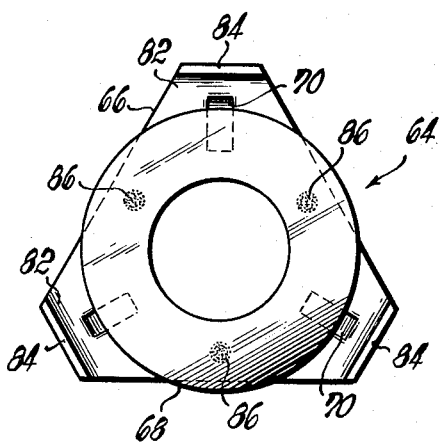
FIG. 2 shows a motion transmitting element of the apparatus of FIG. 1 in axial end view.

Referring now to the drawing in detail, and initially to FIGS. 1 to 3, there is seen a flywheel 10 whose hub portion is recessed to receive the crankshaft of a driving internal combustion engine, not itself shown. A gear rim 12 on the flywheel is normally engaged by a drive pinion of an electric starter motor, as is conventional. A ball bearing 14 in the flywheel 10 receives the free end of a shaft 16 which is the input shaft of a multiple-speed transmission, not otherwise shown.

Splines 18 on the shaft 16 engage corresponding grooves in a hub 20 so that the hub may slide axially on the shaft 16, but is secured against rotation. An integral flange 22 on the hub 20 carries an annular clutch disk or plate 24 which carries frictional facings 26, 28. An annular cover 30 fixedly fastened on the flywheel 10 carries the pressure plate 32 of the clutch. Three helical pressure springs 34 of which only one is seen in the drawing, are mounted in respective cup-shaped receptacles 36 which are spaced 120° apart on the circumference of the cover 30. Each spring abuts against the bottom 38 of the associated receptacle and against the pressure plate 30.

The release mechanism 40 mainly consists of three clutch release levers 42 and of the elements which link the levers to the pressure plate 32 and to the flywheel 10. Each lever 42 of which only one is seen in the drawing has an opening 44 in which the reduced terminal portion 46 of a bracket 48 is received. The dimensions of the opening 44 and of the bracket portion are such that the lever may pivot on the bracket portion 46 in the axial plane of FIGS. 1 to 3. The bracket 48 is fixedly attached to the cover 30, and thereby to the flywheel 10. The three levers 42 are sheet metal stampings of U-shaped cross section and extend in respective common axial planes with the three springs 34.

The pivot 46 divides each lever 42 into a longer arm which extends radially inward from the pivot, and a shorter arm which extends radially outward. Eye bolts 50 associated with the levers 42 are partly received in respective radial notches 52 in the circumference of the pressure plate 32, and are pivotally attached to the plate by pivot pins 54. The threaded portion of each eye bolt 50 extends through an opening in the shorter arm of the lever 42 and carries a retaining nut 56 and a washer 58. The portion 60 of the lever through which the eye bolt 50 passes is arcuately offset so as to make rolling line contact with the washer 58 when the lever 42 moves on its pivot 54. The free end 62 of the shorter lever arm is forked and receives a projecting portion of the cover 30 for guiding the lever during its pivoting movement.

When the lever 42 pivots clockwise on the bracket portion 46, as viewed in FIGS. 1 and 3, the pressure plate 30 is pulled axially away from the flywheel 10 by the eye bolts 50, and the clutch is released. The clutch release mechanism includes a ring 64 which is composed of two annular disk-shaped sheet metal stampings 66, 68, which are separately shown in an axial end view in FIG. 2.

The fastening disk 66 has the approximate shape of a regular triangle with cut-off corners. It thus has three lugs 82 portions of which radially project beyond the circular outer circumferenece of the contact disk 68. Radially elongated integral portions of the lugs 82 are axially displaced away from the contact disc 68 so as to form short projecting ribs 70 on the exposed face of the fastening disk 66. The free end 74 of the longer arm of each lever 42 is forked. The radial slot 72 in the forked lever arm receives a rib 70. The forked end portion 74 is also arcuately bent to make rolling line contact with the exposed face of the lug 82 on either side of the rib 70.

The interengaging hinge structure constituted by the rib 70 and cooperating terminal portions of the lever 42 is held together by an approximately U-shaped wire spring. One half of the spring is visible in the drawings (FIGS. 1 and 3), and it will be understood that the non-illustrated half is symmetrical with the illustrated portion with respect to the plane of the drawing.

The free circumferential edge of each lug 82 carries an axially projecting integral bead 84 (FIG. 2) which retains the bight portion 80 of the spring as best seen in FIGS. 1 and 3. The two leg portions 78 extend straight from the bight portion. They are formed with integral spirals 76 whose free ends are secured in bores of the cover 30. The tension of the spirals 76 urges the bight portion 80 against the lug 82, and thereby holds the clutch release ring 64 in hinged engagement with the associated lever 42. The ring 64 is thus suspended from the three levers 42 in coaxial alignment with the other clutch elements. Axial movement of the ring 64 toward the hub 20 releases the clutch.

The two disks 66, 68 are fixedly connected by three spot welds 86, the term "spot weld" being employed to indicate the relatively small dimensions of each weld on the interface of the disks 66, 68, but not to limit the device of the invention to any specific welding technique employed in making the ring 64. The disks consist of sheet steel, and are case hardened and oil tempered after welding. The contact disk 68 is about twice as thick as the fastening disk 66.

The partly conventional means 88 for axially shifting the ring 64 include a clutch release fork 90 which is pivotally mounted on a stationary member in the usual manner, not further illustrated, and whose free ends carry pins 92 on which an annular housing 94 is mounted for axial movement when the fork 90 pivots. A graphite ring 96 is fastened in the housing 94. It has a radial engaging face axially aligned with the exposed face of the contact disk 68.

When the clutch release fork 90 is pivoted counterclockwise from the position shown in FIG. 3, the stationary graphite ring 96 axially abuts against the rotating contact disk 68, and moves the ring 64 toward the hub 20, thereby releasing the clutch. The heat developed by the friction between the graphite ring and the contact disk is dissipated by the relatively great mass of the latter, and is only slowly transmitted to the fastening disk 66 through the spot welds 86. Heat transmission through the remaining portions of the superimposed, but unconnected faces of the disks 66, 68 is relatively insignificant. The ribs 70 further assist in keeping the fastening disk 66 cool.

A modified mechanism 88' for transmitting movement of the clutch release fork 90 to the ring 64 is shown in FIG. 4. The pins 92 carry a bearing sleeve 94' on which the outer race 96' of a ball bearing is mounted. The inner bearing race 98 carries a contact ring 100 for engagement with the exposed face of the contact disk 68 in the manner described hereinabove with reference to FIG. 3.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a friction clutch having two opposite plate members connected for joint rotation about a common axis, yieldably resilient means urging said plate members to move axially toward each other, a clutch plate axially interposed between said plate members for frictional engagement therewith under the urging of said resilient means, and release means for selectively moving said plate members axially away from each other, the improvement in the release means which comprises:
   (a) a plurality of levers circumferentially spaced about said common axis, said levers having respective portions secured to one of said plate members, and being pivotally secured to the other plate member for axial movement of said secured portions when said levers pivot relative to said other plate member, each lever having a free end portion adjacent said axis and movable in an axial direction;
   (b) a ring member coaxial with said plate members and including
      (1) an annular fastening disk secured to said free end portions for axial movement therewith and for joint rotation about said axis,
      (2) an annular contact disk axially superimposed on said fastening disk, and
      (3) each disk being a sheet metal member of substantially uniform thickness and having a radially extending exposed face,
      (4) said disks each having two opposite faces, a plurality of spaced spot welds axially interposed between one face of said fastening disk and one of the two faces of said contact disk, the other face of said contact disk being said exposed face, and said fastening disk being located between said free end portions of the levers and said contact disc, said spot welds fixedy connecting said disks,
      (5) said ring member being normally held in an inoperative position by the urging of said resilient means transmitted by said levers, and
   (c) actuating means axially movable in a direction toward the exposed face of said contact disk into abutting engagement therewith for axially moving said ring member against the restraint of said resilient means, and for thereby moving said plate members axially away from each other.

2. In a clutch as set forth in claim 1, said actuating means being secured against rotation about said axis, and the axial thickness of said contact disk being substantially greater than the axial thickness of said fastening disk.

3. In a clutch as set forth in claim 1, said disks essentially consisting of case hardened steel.

4. In a clutch as set forth in claim 1, a spring member associated with each lever, said spring member being mounted on one of said plate members, each lever and said fastening disk carrying interengageable hinge means, said spring member engaging the hinge means on fastening disk for urging the same into interengagement with the hinge means on the associated lever.

5. In a clutch as set forth in claim 4, said hinge means including a forked terminal portion on said lever defining a radially elongated slit, and an axially projecting integral rib on said fastening disk normally received in said slit.

6. In a clutch as set forth in claim 4, said fastening disc having a plurality of circumferentially spaced integral lugs radially projecting beyond said contact disk, each lug carrying one of said hinge means of said fastening disk.

7. In a clutch as set forth in claim 6, said spring member having two terminal portions secured to said one plate member, and a portion intermediate said terminal portions and abuttingly engaging the associated lug.

8. In a clutch as set forth in claim 7, integral retaining means on each lug for retaining the associated spring member.

9. In a clutch as set forth in claim 8, each lug having a circumferential edge portion projecting radially beyond said contact disk, and said retaining means including a circumferentially elongated integral bead on said edge portion.

10. In a clutch as set forth in claim 1, said free end portions of said levers hingedly engaging respective portions of said fastening disk.

11. In a clutch as set forth in claim 10, said actuating means including fork means arranged for pivoting movement about an axis transverse of said common axis, and an engagement member mounted on a portion of said fork means spaced from said axis, said engagement member moving into said abutting engagement with said contact face during said pivoting movement of the fork means.

12. In a clutch as set forth in claim 1, said disks being substantially flat.

13. In a clutch as set forth in claim 1, said ring member being substantially flat.

References Cited by the Examiner

UNITED STATES PATENTS

| | | | |
|---|---|---|---|
| 1,429,470 | 8/1922 | Wood | 192—98 X |
| 1,907,008 | 5/1933 | Rockwell | 192—68 X |
| 1,998,613 | 4/1935 | Ford | 192—110 X |
| 2,773,576 | 12/1956 | Stenger | 192—68 |
| 2,810,464 | 10/1957 | Geibel | 192—109 |

FOREIGN PATENTS 385,039  12/1932  Great Britain.

DAVID J. WILLIAMOWSKY, *Primary Examiner.*

B. W. WYCHE III, *Assistant Examiner.*